(12) United States Patent
De Bondt et al.

(10) Patent No.: US 12,513,801 B2
(45) Date of Patent: Dec. 30, 2025

(54) POWER CONVERTER FOR CONVERTING AN INPUT TO AN OUTPUT FOR DRIVING A LOAD, AS WELL AS A CORRESPONDING LED BASED LIGHTING DEVICE AND A CORRESPONDING METHOD

(71) Applicant: SIGNIFY HOLDING B.V., Eindhoven (NL)

(72) Inventors: Guy Louis Paul De Bondt, Herentals (NL); Frits Tobi De Jongh, Beek en Donk (NL); Dalibor Cvoric, Gelderland (NL); Hermanus Johannes Maria Vos, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/281,104

(22) PCT Filed: Mar. 4, 2022

(86) PCT No.: PCT/EP2022/055509
§ 371 (c)(1),
(2) Date: Sep. 8, 2023

(87) PCT Pub. No.: WO2022/189273
PCT Pub. Date: Sep. 15, 2022

(65) Prior Publication Data
US 2024/0147590 A1    May 2, 2024

(30) Foreign Application Priority Data
Mar. 12, 2021 (EP) .................................. 21162429

(51) Int. Cl.
*H05B 45/36* (2020.01)
*H05B 45/375* (2020.01)

(52) U.S. Cl.
CPC ............ *H05B 45/375* (2020.01); *H05B 45/36* (2020.01)

(58) Field of Classification Search
CPC ...... H05B 45/36; H05B 45/38; H05B 45/375; H05B 45/385; H05B 45/3725
See application file for complete search history.

(56) References Cited

U.S. PATENT DOCUMENTS

| 5,420,780 A | 5/1995 | Bernstein et al. |
| 9,839,077 B2 * | 12/2017 | Choi .................. H05B 45/59 |
| 10,483,850 B1 | 11/2019 | Homsi et al. |

(Continued)

FOREIGN PATENT DOCUMENTS

| JP | 2009195037 A | 8/2009 |
| JP | 2011165439 A | 8/2011 |

(Continued)

*Primary Examiner* — Tung X Le

(57) ABSTRACT

A power converter for converting an input to an output for driving a load, said power converter comprising a switched mode power supply, SMPS, arranged for receiving an input and for converting said input to an output for driving said load, a buffer capacitor connected in a parallel branch across said load and arranged for buffering said output from said SMPS, a charge circuit, separate from said SMPS, and arranged for providing a charge current to said buffer capacitor until a voltage over said buffer capacitor exceeds a voltage threshold.

12 Claims, 2 Drawing Sheets

(56) References Cited

U.S. PATENT DOCUMENTS

| | | | |
|---|---|---|---|
| 2013/0221867 A1* | 8/2013 | Deppe | H05B 45/3725 |
| | | | 315/224 |
| 2014/0354156 A1* | 12/2014 | Yang | H05B 45/3725 |
| | | | 315/122 |
| 2015/0359052 A1* | 12/2015 | van den Broeke | H05B 45/10 |
| | | | 315/307 |
| 2016/0172992 A1 | 6/2016 | Tallam et al. | |
| 2017/0325302 A1* | 11/2017 | Elferich | H05B 45/14 |
| 2019/0110343 A1* | 4/2019 | Van Kaathoven | |
| | | | H05B 45/3725 |
| 2019/0191506 A1* | 6/2019 | Huang | H05B 45/3725 |
| 2020/0128635 A1 | 4/2020 | Wang et al. | |
| 2021/0007193 A1* | 1/2021 | Arulandu | H05B 45/397 |

FOREIGN PATENT DOCUMENTS

| | | |
|---|---|---|
| JP | 2013545239 A | 12/2013 |
| JP | 2016129146 A | 7/2016 |
| WO | 2013046160 A1 | 4/2013 |

\* cited by examiner

POWER CONVERTER FOR CONVERTING AN INPUT TO AN OUTPUT FOR DRIVING A LOAD, AS WELL AS A CORRESPONDING LED BASED LIGHTING DEVICE AND A CORRESPONDING METHOD

CROSS-REFERENCE TO PRIOR APPLICATIONS

This application is the U.S. National Phase application under 35 U.S.C. § 371 of International Application No. PCT/EP2022/055509, filed on Mar. 4, 2022, which claims the benefit of European Patent application Ser. No. 21/162, 429.1, filed on Mar. 12, 2021. These applications are hereby incorporated by reference herein.

FIELD OF THE INVENTION

The present disclosure relates to a power converter for converting an input to an output for driving a load and, more specifically, to a power converter that is arranged to reduce ripple effects occurring in the current flowing through the load while minimizing the starting time of the power converter.

BACKGROUND OF THE INVENTION

Conventional Switch Mode Power Supplies, SMPS, topologies for power conversion have been applied for decades now. From cost and efficiency point of view, existing topologies like buck converters have been proven to be very effective. The conventional topologies have therefore become fundamental building blocks for any type of power converter. Usually, these topologies are used to convert the total load power and have been proven to do this effectively from cost and efficiency point of view.

These conventional SMPS may be used for a variety of different kinds of loads. One typical type of load is a Light Emitting Diode, LED, based load. In an LED based lighting device, typically or traditionally, the costs of the LEDs were dominant in the cost breakdown of the whole LED based lighting device. However, the price erosion on LEDs has dropped to such a level such that the costs for powering the LEDs, i.e. the power converter, has become more dominant.

The above has led engineers to develop more cost efficient power converters that are still able to adequately power the LEDs or any other type of load for that manner.

A single stage buck converter is used in most circuits which may have a relatively large ripple current through the LEDs. In a conventional way, these drivers are using a ripple remover circuit placed behind the buck converter to make the LED ripple current acceptable low.

The power of the ripple remover circuit is typically wasted in heat. To make an efficient driver these losses are unwanted. There are currently some ideas to remove the ripple current with active circuits which are recuperating the ripple current energy back with less losses but also these will dissipate due to the own circuit consumption of the recuperation circuit. Another way to make the ripple current acceptable is to significantly increase the capacitance of the output capacitor.

One of the disadvantages of an increased output capacitor is that the starting time is also increasing. That is, the output capacitor needs to be charged to a certain level before the voltage over the output capacitor is sufficient for the load, especially an LED based load.

SUMMARY

The present disclosure is directed to a power converter that has a reduced ripple current and, and the same time, has an acceptable starting time. This is accomplished by introducing charge circuit which is explained in more detail here below.

It is therefore an object of the present disclosure to provide for a power converter for efficiently converting an input to an output for driving a load taking into account ripple effects and starting time. It is a further object of the present disclosure to provide for an LED based lighting device as well as a method directed to the operation of such a power converter.

In a first aspect of the present disclosure, there is provided a power converter for converting an input to an output for driving a load, said power converter comprising:
 a switched mode power supply, SMPS, arranged for receiving an input and for converting said input to an output for driving said load;
 a buffer capacitor connected in a parallel branch across said load and arranged for buffering said output from said SMPS;
 a charge circuit, separate from said SMPS, and arranged for providing a charge current to said buffer capacitor until a voltage over said buffer capacitor exceeds a voltage threshold.

The inventors have realized that it may be beneficial to use a relatively large buffer capacitor for tackling ripple effects. The downside of using a relatively large buffer capacitor is that the starting time will increase. The starting time may be defined as the time between actually turning on the power converter until the voltage over the buffer capacitor is sufficient to adequately power the load.

The buffer capacitor is to be charged to a certain charge level before the load will experience a substantive voltage. That is, the voltage over the buffer capacitor would need to rise to a certain level that is acceptable for the load. This is especially true for Light Emitting Diode, LED, based loads wherein the voltage over the buffer capacitor needs to exceed the forward voltage of the LED based load.

The above described downside is tackled, by the present disclosure, by introducing the charge circuit. The charge circuit is arranged to provide for a charge current to the buffer capacitor until the voltage over the buffer capacitor exceeds a certain voltage threshold. This is especially true when the power converter is turned on. In that case it is likely that the buffer capacitor is completely depleted such that it would need to get charged from a depletion stage.

The buffer capacitor may thus be charged, in accordance with the present disclosure, by the charge current of the charge circuit and by the SMPS itself until the voltage over the buffer capacitor exceeds a voltage threshold. From that point onwards, the charge circuit may be disabled such that only the SMPS is responsible for charging the buffer capacitor and thus also for providing the current through the load.

The inventors have noted that the ripple effects may not be an issue during charging of the buffer capacitor until the voltage threshold is reached. As such, it may be possible to accept a higher ripple current during such a stage, which higher ripple current may be caused by the charge circuit. Once the starting phase of the power converter is complete, the charge circuit is disabled which has the effect that the ripple current is reduced. During steady state operation of the power converter, the power is supplied by the SMPS which may be designed in such a way that it causes a reduced ripple current.

In the above described context, it is noted that the ripple may be viewed as the residual, sometimes periodic, variation of the DC power at the output of the SMPS which has been converted from an Alternating Current, AC, input. This ripple is caused by, for example, incomplete suppression of the alternating waveform after rectification.

In an example, the load is a Light Emitting Diode, LED, based load.

The load may consist of a plurality of LEDs cascaded in series. Any type of LEDs may be used, for example Cool White LEDs, Warm White LEDs, or anything alike. The LEDs may also be cascaded in parallel.

The corresponding LED branch may have a so-called forward voltage, wherein the forward voltage defines the required voltage over the LED branch to assure that the LEDs are in a conductive mode. Typically, the forward voltage of an LED is between 1.8 and 3.3 volts. It may vary by the color of the LED. A red LED typically drops around 1.7 to 2.0 volts, but since both voltage drop and light frequency increase with band gap, a blue LED may drop around 3 to 3.3 volts.

The voltage threshold may be set in such a way that it equals the forward voltage of the LED branch, or at least associated or related to the forward voltage of the LED branch. The inventors have realized that ripple effects may not be an issue as long as the LEDs are not conducting, i.e. the forward voltage is not yet reached.

In a further example, the charge circuit is thus arranged for providing said charge current to said buffer capacitor until said voltage over said buffer capacitor exceeds a forward voltage of said LED based load.

The LEDs will start conducting, and thus providing light, whenever the voltage exceeds the forward voltage of the LED based load. The inventors have realized that only then the ripple effect come into play, and that the ripple effect should be reduced as much as possible. That is why the charge circuit is disabled, i.e. the charge circuit no longer provides the charge current to the buffer capacitor.

Once the buffer capacitor reaches a particular voltage, for example the forward voltage of the LED based load, the charge circuit may stop in providing the charge current.

In a further example, the charge circuit comprises an output switch for enabling, and disabling, said charge circuit, and wherein said output switch is controlled based on said voltage over said buffer capacitor.

The switch may, for example, be a Field Effect Transistor, FET, based switch or anything alike.

In a further example, the charge circuit comprises an output switch for enabling, and disabling, said charge circuit, and wherein said output switch is controlled based on a voltage over at least a part of said load.

The buffer capacitor is connected in a parallel branch across the load and is arranged for buffering the output from the SMPS. This means that the voltage over the buffer capacitor is coupled, or associated, with the voltage over the load. Effectively, the voltage over the load may be measured, or fed back, to the charge circuit. According to the present disclosure the voltage over the load may be used as an input parameter as that voltage also reflects the voltage over the buffer capacitor.

The output switch may, for example, be a Field Effect Transistor, FET, or anything alike. The gate of the FET may be controlled by the voltage over the buffer capacitor of the voltage over at least a part of the load.

In an example the load is an LED based load having a plurality of in series connected LEDs, and wherein said output switch is controlled based on a voltage over at least one of said plurality of in series connected LEDs.

The LED based load may have multiple in parallel connected branches, wherein each branch may comprise a plurality of in series connected LEDs. The LEDs may be white LEDs, blue LEDs, red LEDs, green or yellow LEDs, or a combination thereof. The parallel branch may also comprise a sensing resistor for sensing the current flowing through a particular branch. The voltage over the sensing resistor may be used to control the output switch of the charge circuit.

In an example the capacitance of the buffer capacitor is between 500 µF and 1500 µF.

The nominal value of the capacitance of a capacitor may be the most prominent characteristic. This value is typically measured in pico-Farads, pF, nano-Farads, nF, or micro-Farads, pF, and is also typically marked onto the body of the capacitor as numbers, letters, or colored bands.

In the present case, the capacitor may be a so-called electrolytic capacitor. The relatively large capacitance of electrolytic capacitors makes them particularly suitable for energy storage purposes like buffering.

In a further example, the charge circuit comprises a thermistor at an output of said charge circuit.

The thermistor is a type of resistor whose resistance depends on the actual temperature, more than compared to regular or standard resistors. The wording thermistor is a combination of thermal and resistors. Two different types of thermistors exist, a Negative Temperature Coefficient, NTC, thermistor and a Positive Temperature Coefficient, PTC, thermistor. In the present scenario a PTC thermistor may be used for safety reasons. The output current of the charge circuit may, for whatever reason, exceed acceptable levels. The output current will pass the PTC thermistor which will inherently heat up the PTC thermistor as well. The increase temperature of the PTC thermistor will cause the PTC thermistor to have a higher resistance, thereby reducing the output current. It, thus, forms a sort of safety net for assuring that the output current does not exceed particular safety levels.

In a further example, the switched mode power supply comprises a buck converter.

A buck converter, also called step-down converter, is a power converter which steps down the voltage from its input to its output. It is a class of switched-mode power supply, SMPS, typically containing at least two semiconductors like a diode and a transistor, although modern buck converters frequently replace the diode with a second transistor used for synchronous rectification, and at least one energy storage element, i.e. the buffer capacitor.

In a further example, the charge circuit comprises:
  a controller arranged for measuring said voltage over said buffer capacitor and for activating, and deactivating, said charge circuit in accordance with said measured voltage.

The controller may, for example, be a semiconductor device like an integrated circuit, a micro controller or anything alike.

In another example, the charge circuit comprises a rectifier for rectifying an Alternating Current, AC, mains input.

In a second aspect of the present disclosure, there is provided a Light Emitting Diode, LED, based lighting device comprising a power converter in accordance with any of the previous examples.

It is noted that the advantages as explained with respect to the first aspect of the present disclosure, being the power converter for converting an input to an output, are also applicable to the second aspect of the present disclosure, being the LED based lighting device.

In a third aspect of the present disclosure, there is provided a method of converting an input to an output for driving a load by using a power converter in accordance with any of the examples provided above, wherein the method comprises the steps of:

provided, by said SMPS, said output for driving said load;

providing, by said charge circuit, said charge current to said buffer capacitor until a voltage over said buffer capacitor exceeds a voltage threshold.

It is noted that the advantages as explained with respect to the first aspect of the present disclosure, being the power converter for converting an input to an output, are also applicable to the third aspect of the present disclosure, being the method of operating the power converter.

In an example, the step of providing said charge current comprises:

providing, by said charge circuit, said charge current to said buffer capacitor until said voltage over said buffer capacitor exceeds a forward voltage of said LED based load.

In a further example, the charge circuit comprises an output switch for enabling, and disabling, said charge circuit, and wherein said method comprises the step of:

controlling, by said charge circuit, said output switch based on said voltage over said buffer capacitor.

These and other aspects of the invention will be apparent from and elucidated with reference to the embodiment(s) described hereinafter.

DETAILED DESCRIPTION

Figure 1:
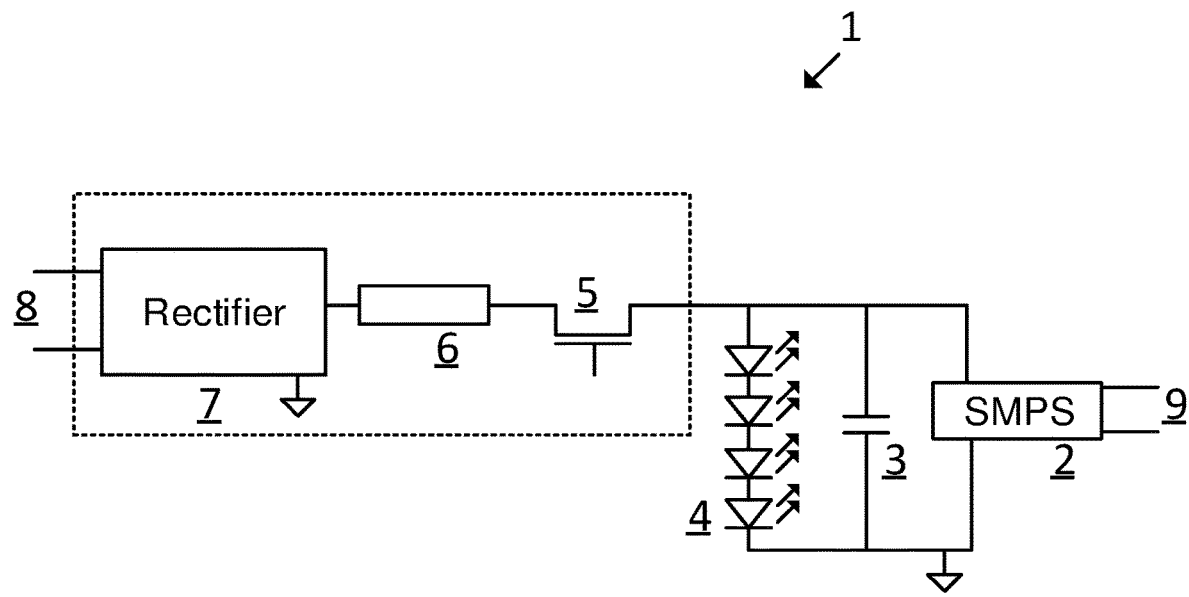
FIG. 1 discloses an example of a power converter in accordance with the present disclosure.

FIG. 1 discloses an example of a power converter 1 in accordance with the present disclosure.

The power converter 1 is arranged for converting an input to an output for driving a load 4. In this particular scenario, the load 4 is a Light Emitting Diode, LED, based load.

A Switched Mode Power Supply, SMPS, 2 is provided which is arranged for receiving an input via input terminals 9 and for converting the input to an output for driving the load 4.

The input may be an Alternating Current, AC, input or a rectified AC input. The input may, for example, be a 230V AC input that is down converted to a nominal DC voltage for empowering the LEDs 4.

A buffer capacitor 3 is provided which is connected in a parallel branch across the load 4 and is arranged for buffering the output from the SMPS 2. The buffer capacitor 3 may assure that the voltage over the LEDs 4 is reasonably constant, i.e. without any ripple such that flickering is mitigated.

Ripple is, in electronics, considered as the residual, often periodic, variation of the DC voltage, or DC current, within the power converter which has been derived from an AC source. This ripple may often be caused by an incomplete suppression of the alternating waveform after rectification, for example by the SMPS 2. Ripple voltage originates as the output of a rectifier or from generation and commutation of DC power.

The inventors have noted that it may be desirable to have a relatively large buffer capacitor to effectively combat ripple effects. A large buffer capacitor would have the beneficial effect that ripple currents are reduced.

One of the downsides of a large buffer capacitor 3 is related to the start-on time. Every time the power converter is started, the buffer capacitor 3 needs to charge to a certain level before it is sufficient to adequately empower the load. In this particular scenario, the voltage over the buffer capacitor 3 may need to exceed the forward voltage of the LEDs 4 to ensure that the LEDs start emitting light.

The larger the buffer capacitor 3, the more time it will take before the voltage over the buffer capacitor 3 is sufficient. This is also called the start-on time. As such, although a large buffer capacitor 3 may have an advantage in that ripple effects are effectively tackled, a large buffer capacitor 3 may lead to an undesired long start-on time.

The inventors have realized the above and found an adequate solution which allows for the use of a large buffer capacitor 3 while still maintaining an acceptable start-on time. This is accomplished by introducing a charge circuit, which is indicated in FIG. 1 by the dotted lines.

The charge circuit is separated from the SMPS and is used for providing a charge current to the buffer capacitor 3 until the voltage over the buffer capacitor exceeds a voltage threshold, for example the forward voltage of the LEDs 4.

Separate entails that a different current path is used for charging the buffer capacitor. Thus, a current path that is not equal to the current path originating from the SMPS.

So, the SMPS is arranged to provide a current to the load as well as to the buffer capacitor. The charge circuit is arranged to provide separate current, i.e. separate from the current provided by the SMPS, to the buffer capacitor.

The charge circuit thus does not influence the current provided by the SMPS.

The exact implementation of the above may differ. It is noted that the charge circuit may be activated for a certain amount of time before it is deactivated. This particular embodiment is also tailored to the voltage over the buffer capacitor. As such, the charge circuit may be implemented in such a way that it is activated for a particular amount of time, for example tens to hundreds of milliseconds, before it is deactivated. This, effectively, accomplishes that the charge circuit is disabled when the voltage over the buffer capacitor 3 exceeds a voltage threshold.

The charge circuit is thus arranged for receiving an input, for example a mains input, and for converting the input to a charge current towards the buffer capacitor 3. The input does not necessarily need to be the same input as the input for the SMPS 2. The input is received via input terminals 8.

In the scenario shown in FIG. 1, the input is an Alternating Current, AC, based input. The AC based input is rectifier by the rectifier 7 such that at the output of the rectifier a DC voltage is provided. The DC voltage is then used, by the charge circuit, to charge the buffer capacitor 3. This may effectively be accomplished by introducing the switch 5. The switch 5 is activated for charging the buffer capacitor 3 and is deactivated when it is no longer needed to charge the buffer capacitor 3.

The buffer capacitor 3 may be charged via a resistor, for example a thermistor 6. The thermistor may act as a resistor to control the charge current towards the buffer capacitor 3 and, at the same time, may act as a safety measure for assuring that no hazardous situation may occur in the power converter. That is, if the charge current becomes too high, for whatever reason, the thermistor will act as a high resistor and will thereby thus ensure that the charge current will not exceed hazardous current levels. The resistor may also be a fusible resistor for increasing the protection.

The switch 5 may be implemented as a Field Effect Transistor, FET, a regular transistor, or anything alike. This is explained in more detail with respect to FIGS. 2 and 3.

Figure 2:
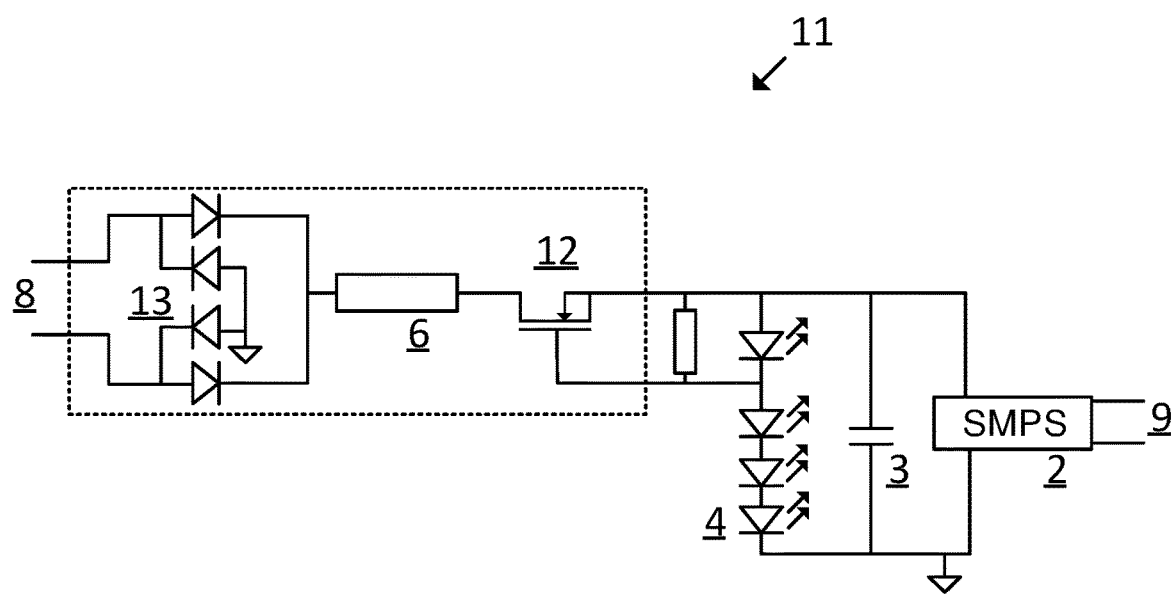
FIG. 2 discloses another example of a power converter in accordance with the present disclosure.

FIG. 2 shows a specific implementation of the power converter 11 in accordance with the present disclosure. Here, for convenience, the same reference numerals are used in relation to FIG. 1 for the same, or similar, functions or blocks.

In this particular case, the charge circuit comprises a diode-based rectifier 13 for rectifying the AC input 8.

The rectifier 13 is thus used for conversion of an alternating-current, AC, input into a direct-current, DC, output, and is also known as a bridge rectifier. A bridge rectifier provides full-wave rectification from a two-terminal based AC input 8.

The switch 12 is a depletion Metal Oxide Semiconductor, MOS, Field Effect Transistor, FET. The MOSFET is arranged in such a way that it will conduct the charge current if the gate-source voltage is positive or even zero volts. The MOSFET will stop conducting once the gate-source voltage reaches a negative threshold value.

At first, the buffer capacitor 3 is empty and thus the voltage over the buffer capacitor 3 is zero. This means that the LEDs are not turned on. The gate-source is voltage is thus also zero volt which means that the switch is activated. Charge current will flow from the charge circuit to the buffer capacitor 3.

The amount of current may be determined by selecting the thermistor 6. A low value for the thermistor 6 will lead to a relatively high charge current and a high value for the thermistor 6 will lead to a relatively low charge current.

Once the voltage over the buffer capacitor 3 is above a certain threshold, for example the forward voltage threshold of the LEDs 4, the LEDs 4 start conducting and emitting light. In that case the gate-source voltage of the switch 12 will drop below a negative threshold value such that the switch 12 becomes deactivated. From that moment in time, the SMPS 2 is the (only) responsible converter for charging the buffer capacitor 3 and thus also empowering the LEDs 4.

The electrical circuit shown in FIG. 2 has the advantage that, in normal mode, i.e. when the switch 12 is closed, the circuit does almost not consume any power at all. The further advantage is that only a few components are used for implementing the charge circuit, thereby keeping the total costs of the charge circuit low.

Figure 3:
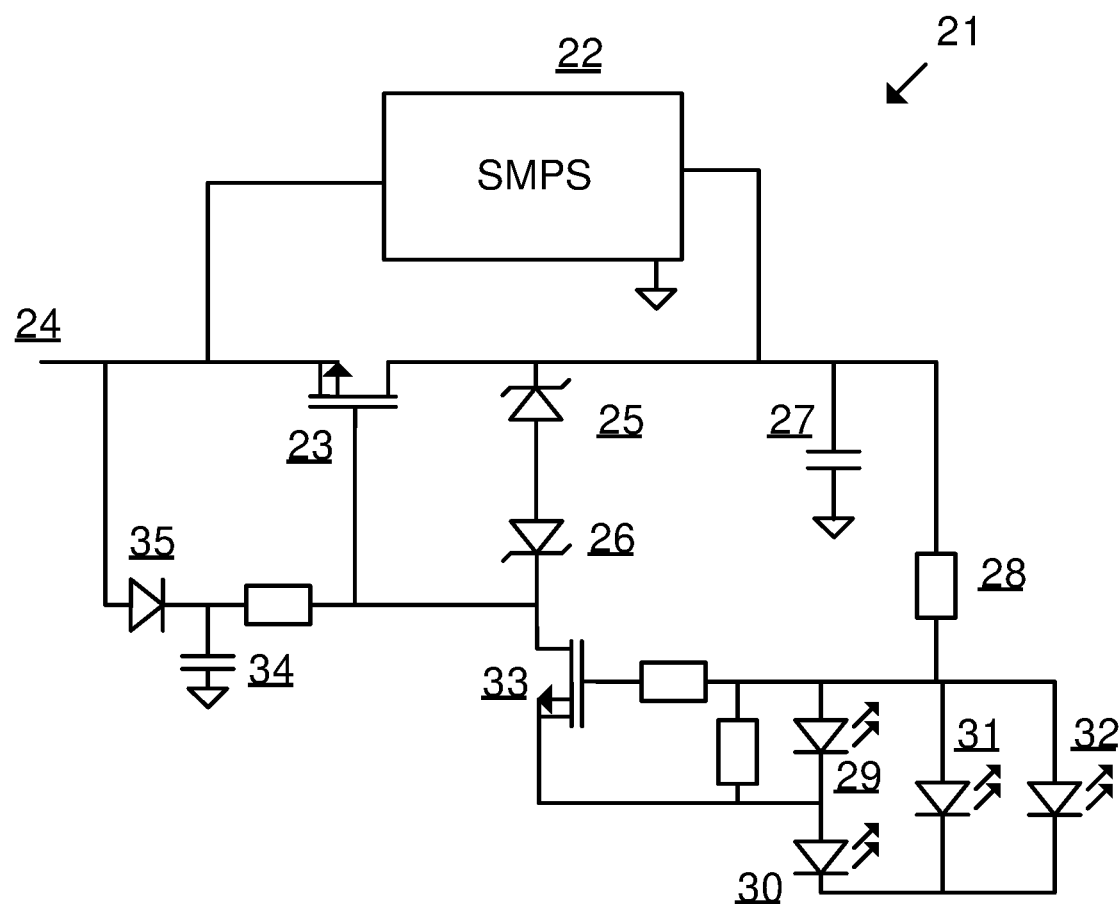
FIG. 3 discloses a further example of a power converter in accordance with the present disclosure.

A variant 21 to the electrical circuit shown in FIG. 2 is shown in FIG. 3. In this particular case, two switches 23, 33 are used for implementing the charge circuit. These switches are considered regular, enhancement, MOSFETs instead of a depletion MOSFET as in FIG. 2.

The SMPS 22 is again provided for providing an output to the buffer capacitor 27 and as well to the LED based load 29, 30, 31, 32 via the resistor 28.

Consider the situation in which the buffer capacitor 27 is discharged. The capacitor 34 will be charged first to the rectified mains, originating from reference numeral 24 and via diode 35. The gate source voltage of the switch 23 will be limited by the Zener diodes 25, 26 and is, for example, +15V. This will assure that the switch 23 will be conducting such that the rectified mains 24 is connected to the buffer capacitor 27, thereby charging the buffer capacitor. Again, a thermistor (not shown) may be used for regulating the corresponding charge current.

After some time, for example after about 100 milliseconds, the voltage over the buffer capacitor may reach the forward voltage of the LEDs 29, 30, 31, 32. The LEDs 29, 30, 31, 32 may thus start to conduct, and the gate-source voltage of the switch 33 may then be equal to the forward voltage of the LEDs having reference numeral 29. The switch 33 may then be turned on, and the Zener diodes 25, 26 will assure that no current will flow. This has the effect that the gate-source voltage of switch 23 is adjusted such that the switch 23 is no longer in conductive mode such that there will no longer be a charge current from the rectified mains 24 to the buffer capacitor 27.

It is noted that the diode 35 as well as the capacitor 34 may be omitted for cost effective purposes. Further, the Zener diode 25 may be interchanged for a regular diode without loss of functionality.

Following the above, in a specific example, there is provided a large output capacitor having high value in the range of 500 uF till 1000 uF. This leads without additional circuitry to a large starting time. The present disclosure is directed to have an additional charge current besides the buck converter starting current. The parallel path, i.e. the charge circuit, can be realized with a switch and a resistor, for example a thermistor. The buffer capacitor is charged quicker till the forward voltage of the LEDs is reached. The starting time of the buck converter can be reduced significantly since the buck converter output voltage is quick on the level of the LED voltage. There are several circuits available which will do the job to quickly charge the buffer capacitor of which examples are given in FIGS. 2 and 3.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

Any reference signs in the claims should not be construed as limiting the scope thereof.

The invention claimed is:

1. A power converter for driving an LED based load, comprising a plurality of in series connected LEDs, said power converter comprising:
 a switched mode power supply (SMPS) arranged for receiving a first input and for converting said first input to an output for driving said LED based load;
 a buffer capacitor connected in a parallel branch across said LED based load and arranged for buffering said output from said SMPS;
 a charge circuit, separate from said SMPS, and arranged for providing a charge current to said buffer capacitor until a voltage over said buffer capacitor exceeds a voltage threshold, wherein the charge circuit is arranged for receiving a second input separate from the SMPS,
 wherein said charge circuit comprises an output switch for enabling, and disabling, said charge circuit, and wherein said output switch is controlled based on a voltage over at least one of said plurality of in series connected LEDs.

2. The power converter in accordance with claim 1, wherein said charge circuit is arranged for providing said charge current to said buffer capacitor until said voltage over said buffer capacitor exceeds a forward voltage of said LED based load.

3. The power converter in accordance with claim 1, wherein a capacitance of said buffer capacitor is between 500 µF and 1500 µF.

4. The power converter in accordance with claim 1, wherein said charge circuit comprises a thermistor at an output of said charge circuit.

5. The power converter in accordance with claim 1, wherein said switched mode power supply comprises a buck converter.

6. The power converter in accordance with claim 1, wherein said charge circuit comprises:
   a controller arranged for measuring said voltage over said buffer capacitor and for activating, and deactivating, said charge circuit in accordance with said measured voltage.

7. The power converter in accordance with claim 1, wherein said charge circuit comprises a rectifier for rectifying an Alternating Current, AC, mains input received via the second input.

8. A Light Emitting Diode (LED) based lighting device comprising the power converter in accordance with claim 1 and the LED based load.

9. A method for driving an LED based load comprising a plurality of in series connected LEDs by using a power converter, wherein said method comprises:
   providing, by a switched mode power supply (SMPS) of the power converter, an output for driving said LED based load, wherein the SMPS receives a first input and converts the first input to the output for driving the LED based load; and
   providing, by a charge circuit of the power converter, a charge current to a buffer capacitor of the power converter until a voltage over said buffer capacitor exceeds a voltage threshold, wherein the buffer capacitor is connected in a parallel branch across said LED based load and arranged for buffering said output from said SMPS, and wherein the charge circuit is arranged for receiving a second input separate from the SMPS;
   wherein said charge circuit comprises an output switch for enabling, and disabling, said charge circuit, and wherein said output switch is controlled based on a voltage over at least one of said plurality of in series connected LEDs.

10. The method in accordance with claim 9, wherein providing said charge current comprises:
   providing, by said charge circuit, said charge current to said buffer capacitor until said voltage over said buffer capacitor exceeds a forward voltage of said LED based load.

11. The method in accordance with claim 9, wherein said method comprises:
   controlling, by said charge circuit, said output switch based on said voltage over said buffer capacitor.

12. The method of claim 9, wherein said charge circuit comprises a thermistor at an output of said charge circuit.

* * * * *